Sept. 27, 1966 J. L. SHANKS 3,275,978
SEISMIC SIGNAL PROCESSING BY EQUALIZATION OF
FREQUENCY COMPONENTS OF A SEISMIC SIGNAL
Filed March 1, 1963

John L. Shanks INVENTOR.

BY John D. Gassett
ATTORNEY

United States Patent Office 3,275,978
Patented Sept. 27, 1966

3,275,978
SEISMIC SIGNAL PROCESSING BY EQUALIZATION OF FREQUENCY COMPONENTS OF A SEISMIC SIGNAL
John L. Shanks, Tulsa, Okla., assignor, by mesne assignments, to Esso Production Research Company, Houston, Tex., a corporation of Delaware
Filed Mar. 1, 1963, Ser. No. 262,106
5 Claims. (Cl. 340—15.5)

This invention relates to improvements in the art of seismic exploration. It is more particularly concerned with a system to aid in determining the nature and position of a subsurface strata by seismic methods. It is particularly concerned with a new system for processing a seismic signal.

The method commonly employed in searching for petroleum or other mineral deposits is that known as seismic prospecting wherein a seismic disturbance is initiated at a selected point in or near the earth's surface to direct seismic waves downwardly into the earth from that point. The waves continue to travel downwardly within the earth until they encounter discontinuities in the earth's structure and composition in the form of various substrata formations and the like. These discontinuities have the effect of reflecting a portion of the seismic waves back toward the surface of the earth. Sensitive pickups, sometimes called seismic detectors, seismometers or geophones, are arranged at detection points along the earth to translate the detected earth motion into electrical impulses which after suitable amplification are recorded. The signal recorded then is usually indicative of the character of the ground motion and of the position of the reflecting beds and are usually referred to collectively as a seismic signal which is in effect a composite signal made up of a plurality of electrical signals varying in frequency and amplitude. The electrical signals oscillate about a no-signal zero voltage or quiescent record base line. The seismic signal thus detected and recorded is then processed and displayed in various ways.

It is the general practice to amplify the seismic signal generated by a geophone and to record the signal by means of a suitable camera. The camera may take the form of a recording oscillograph or as is more recently the case, it may take the form of a magnetic or a photographic recording device capable of recording the signal in reproducible form. It is this amplified record signal with which seismic computers make their study.

Most conventional seismographs, that is, devices for recording the seismic signals, are capable of recording up to 24 or more separate seismic signals simultaneously. Thus if a seismic observation results in 24 seismic signals being generated at as many detection stations, the resulting seismogram is a 24 trace record of the resulting 24 signals. The traces are usually arranged in a side-by-side relationship and a timing trace indicating predetermined time intervals is simultaneously recorded with the seismic signals to indicate the elapsed time from the shot to any point on each trace. Once the seismogram has been made persons skilled in the art are generally able to determine from the data recorded on the seismogram certain characteristics of the earth's substrata in the vicinity of the seismic observation. Usually a series of seismograms are arranged in a side-by-side relationship in order to give a seismic section of a portion of the earth under study. Additional seismograms are usually obtained by having a sequence of seismic disturbances at some selected pattern. A selected pattern of seismic observations are also made for each seismic disturbance and a seismogram is prepared for each such seismic observation. The seismograms then in order to obtain a larger picture of the subsurface formations are arranged in a side-by-side relationship forming what is commonly called a seismic section.

In studying a seismic section it has been found that changes in subsurface layering or bed parameters may be expressed on the seismogram or seismic section as changes in the frequency content or amplitude of reflections from the layering or discontinuities. Unfortunately other factors which are herein called for convenience shooting (and recording) parameters can also change these measured quantities. In order to properly correlate the frequency and amplitude content of the recorded seismic signals with stratigraphy it is desirable that the shooting parameters be constant along the same line; that is, along the line of the seismic section under study. It is quite difficult to guarantee a constant down-traveling pulse in the field due to varying conditions of various shot points and the like. Therefore there is a need for a playback technique or processing system whereby the effect of changing near shot point conditions on the field data can be eliminated from the data when processed. Such a processing system is disclosed herein.

It is convenient to describe the character of a seismogram as being dependent upon the parameters of three basic units: (1) the seismic source, (2) the reflection traveling path, and (3) the recording equipment. More specifically, the frequency and amplitude content of the recorded reflections are dependent upon the charge size and the shot depth of the source, the time geometry and other properties of the reflection beds, and the recording parameters, including the filtering action of geophone coupling and near surface variations, for example.

To study changes in reflection forms for stratigraphic significance, it is important that the source and receiver parameters be kept constant along the seismic line of the seismic section. Then one can safely correlate observed amplitude and frequency changes to the property of the reflection beds. Unfortunately this condition is not easily satisfied in practice. Quite frequently the shape of the initial down-traveling pulse changes from one shot point to the next which may be due to the use of a different charge size in case of a dynamite explosion, for example, or a different shooting medium. That is, the velocity of the near surface layer may vary. This pulse change along the profile caused by charge size etc. is usually expressed as a change in the form of the recorded section. Even if one is successful in having a down-traveling pulse that is constant, up-traveling reflections can be altered by near surface or surface conditions. As an example of the problem involved, a reflection event might be indicated to appear on one portion of a seismic section as a change in frequency from 40 to 42 cycles per second and the same event might appear elsewhere on the seismic section as being indicative of the change of frequency from 44 to 46 cycles per second. The difference in frequency content of the signal representing the same reflection event may not be due to any property of the reflection bed but rather to an expression of the fact that the input pulse had changed from one shot point to the other. The occurrence of different frequencies of this type is confusing and makes much more difficult the process of interpretation of the seismic section.

At present field technique does not provide for a convenient means of predicting and eliminating the effects discussed above except by costly reshooting on a trial and error basis. The logical approach is the compensating for near shot variations by special or unique seismic processing system for the recorded seismic signal. This can be accomplished with the process or method disclosed herein. The initial input signal can be expressed as $S(t)$ which has a frequency spectrum expressed as $S(\omega)$. In order to eliminate the difference in parameter due to shot points and other features, each signal $S(t)$ of a seismic section (which contains a plurality of such signals $S(t)$) is adjusted so that it will have the selected frequency spectrum.

The system of this invention receives the current signal $S(t)$ and analyzes it according to the amount of energy in particular selected frequency components. The system can adjust itself to produce from the signal another signal with a preset desired frequency spectrum.

Various other objects and a better understanding of the invention can be had from the following description taken in conjunction with the drawing in which.

Figure 1:
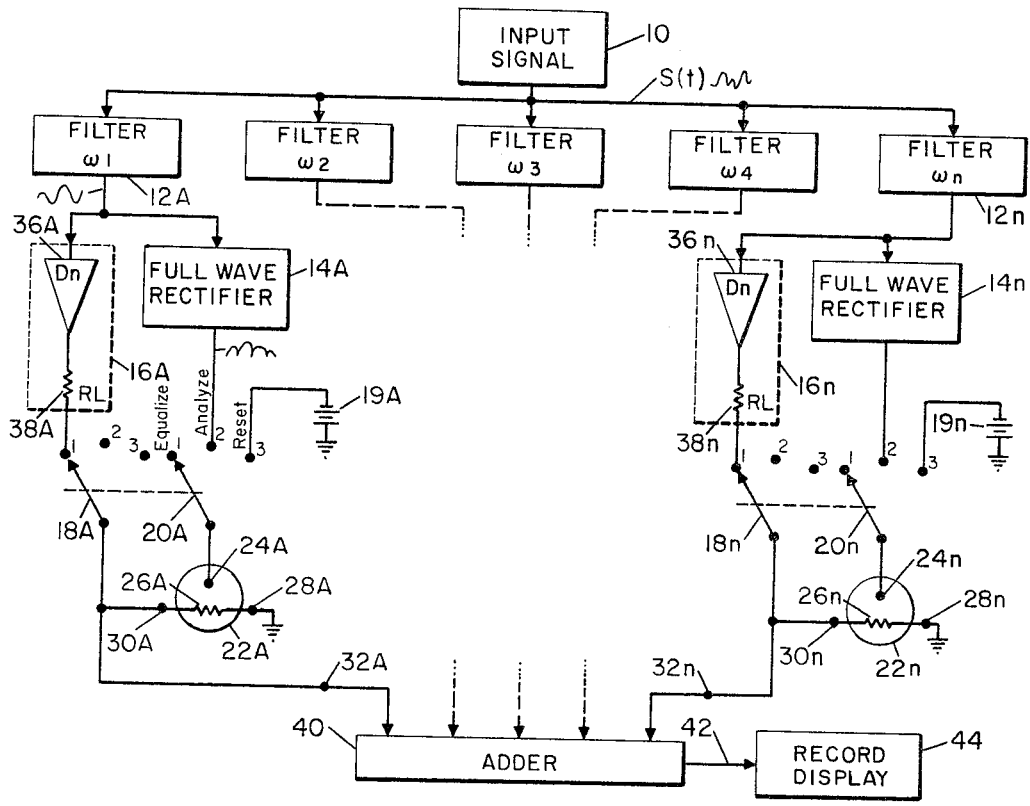
FIG. 1 represents in block diagram form one embodiment of an automatic spectrum adjusting filter.
Figure 2:
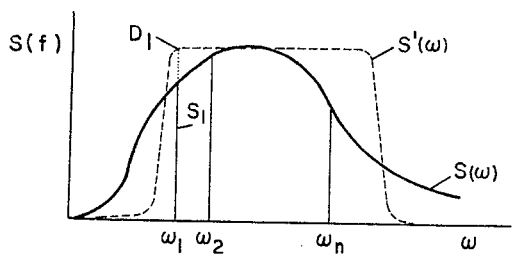
FIG. 2 illustrates by the solid line the representation of the spectrum of $S(t)$ and by a dotted line the representation of the desired spectrum.

Illustrated in FIG. 1 is an input signal source 10 whose output is $S(t)$. The input signal source 10 is most frequently a seismic signal stored on a magnetic tape and reproduced therefrom. The signal $S(t)$ has a frequency spectrum $S(\omega)$ as illustrated in FIG. 2 in which the abscissa is $\omega$ and the ordinant is $S(\omega)$. It will be assumed that it is desired to adjust the signal $S(t)$ such that its frequency spectrum is $S'(\omega)$ as illustrated by the dotted line of FIG. 2. In the amplitude spectrum of FIG. 2 each frequency has an amplitude representing the amount of energy in that frequency compared to the other frequencies. For example, the frequency $\omega_1$ has an amplitude $S_1$. In order for the spectrum $S'(\omega)$ to be realized, the energy content of the frequency component $\omega_1$ should be increased so that the amplitude $S_1$ is extended to the dotted line. It should have an amplitude which for convenience is specified as $D_1$. The amount of amplification of $S_1$ to $D_1$ is called for convenience $A_1$ and can be written in the Equation 1:

(1) $$A_1 = \frac{D_1}{S_1}$$

or in general, (2) $$A_n = \frac{D_n}{S_n}$$

Attention is now directed back to FIG. 1 which illustrates an embodiment of the invention where first the signal is analyzed to obtain a measure of the energy $S(\omega)$ for each frequency of interest, and secondly the energy of each frequency component is adjusted so that its $S_n$ becomes $D_n$.

The signal $S(t)$ from input signal source 10 is fed to a plurality of filter sections 12A through 12n. These filter sections are highly tuned to pass only the frequency assigned to it. In such case there would be one filter section for each frequency of interest. If the frequency of interest of the seismic signal $S(t)$ is from 30 to 60 for example, and if, for example, the band pass of each filter section is one cycle per second, there would be a filter section 12A for 30 cycles per second, 12B for 31 cycles per second, etc. until filter section 12n for frequency 60.

Each filter section has a channel of equipment for processing the frequency component assigned to that filter section. As the many channels are essentially the same, only the equipment associated with one channel will be discussed in detail. The output of filter 12A is fed to a full-wave rectifier 14A and to a constant current source 16A. Constant current source 16A includes an amplifier 36A having a gain of $D_n$ and a resistance $R_L$ 38A. By constant current source it is meant that the output current of the current source is proportional to the input signal, and is essentially independent of the load resistance applied to the output of the constant current source. In addition to the circuit given, other circuits, notably pentode amplifier and certain transistor circuits, approach the ideal constant current source and may be used in place of the given circuit. Also shown are a pair of ganged switches 18A and 20A, each having positions 1, 2 and 3. The three positions can also be called equalize, analyze, and reset, for positions 1, 2 and 3 respectively.

Also shown in FIG. 1 is a chemical integrator 22A. The chemical integrator shown is a variable resistance which can for example be a memistor, that is a resistor with a memory, and which uses the phenomena of electroplating to control resistance by depositing metal on a resistive substrate. For example, copper can be electroplated from a copper sulphate-sulphuric acid bath upon an ordinary pencil lead. Chemical integrator 22A has a control element 24A which is connected to the common terminal of switch 20A. Control element 24A can also be referred to as a metallic source and can for example be a source of copper. The chemical integrator 22A has a substrate resistance structure 26A which is a variable resistance. Element 26A can for example be ordinary pencil lead and its resistance depends upon the amount of copper electroplated thereon. This particular type device is like a three-terminal transistor, except that the resistance between two of the terminals is controlled not by instantaneous control current in the third, but by the time integral of this current.

The substrate resistance 26A has two external taps, one 28A and the other 30A. Tap 28A is connected to ground and tap 30A is connected to the common terminal of switch 18A and to output $E_0(t)$ tap 32A. The sensing current is introduced to the chemical integrator through tap 30A to substrate resistance 26A. The conductance of substrate resistance 26A increases linearly with the amount of plating over the time interval of plating of interest.

Although only systems for channels for the frequency $\omega_1$ and the frequency $\omega_n$ have been indicated in FIG. 1, it will be understood that there will be a channel for each frequency of interest. In other words, each frequency filter 12A to 12n will have a full-wave rectifier, a constant current source, switches 18A and 20A and the chemical integrator 22A similarly as shown for frequency $F_1$.

Having described the structure of the channelized analysis for one filter frequency, attention will now be directed toward its operation. Before starting the input signal being reproduced, switches 18A and 20A are put in their number 2 position. It will further be assumed that chemical integrator 22A is reset to its initial conductance. Input signal source 10 is activated to produce a seismic signal $S(t)$ which is fed to each of the filters 12A to 12n. The output of filter 12A is a sinusoidal type wave having essentially one frequency, for example 30 cycles per second. This filtered frequency $S_1(t)$ is fed to full-wave rectifier 14A. The rectified output from rectifier 14A is fed through switch 20A and its number 2, or analyze, position to the control element 24A of chemical integrator 22A. The conductance of substrate resistance 26A is thus increased directly proportional to the total full-wave rectifier signal which in effect modifies the conductance of resistance 26A (sometimes herein called $R_m$) to be proportional to the integrated signal from rectifier 14A. In other words, the conductance of the substrate resistance 26A is a measure of the time integral of the signal from the rectifier 14A, and is thus a measure of the energy in the signal $S(t)$ at the frequency $\omega_1$.

As soon as the signal $S(t)$ has been processed through the full-wave rectifier and set up the chemical integrator 22A to have the proper conductance, switches 18A and 20A are switched to their "1," or equalize, positions. The output of filter 12A can be described as $S_1(t) = S(t)$ convoluted with $F_1(t)$ in the time domain and $$S_1(\omega) = S(\omega) F_1(\omega)$$

in the frequency domain, where $S(t)$ and $S(\omega)$ are expressions of the input signal to the filter 12A expressed as time and frequency functions, $S_1(t)$ and $S_1(\omega)$ are expressions of the output signal from the filter expressed as time and frequency functions, $F_1(t)$ is the time transfer function of the filter 12A, and $F_1(\omega)$ is the frequency transfer function of the filter 12A. The output of filter 12A is fed to constant current source 16A. Amplifier 36A is set to have an amplification $D_1$ equal to the desired energy amplitude for frequency $\omega_1$ as illustrated in FIG. 2. $D_n$ is taken from FIG. 2 for each frequency of interest and the maximum amplitude $S'(\omega)$ can be taken as unity and the other values of $D_n$ for the different frequencies would be proportional parts thereof. Resistance 38A is great compared to the resistance 26A ($R_m$) of chemical integrator 22A. The output signal $E_o(t)$ taken off tap 32A has a measure of energy $D_n$ as desired and is shown in the illustration of FIG. 2. This can be seen as follows:

The conductance $\rho$ is approximately proportional to $S_n$, i.e. $\rho \sim S_n$; thus $$(1) \quad R_m = \frac{1}{\rho}$$

in which the conductance $\rho$ is proportional to $S_n$. $S_n$ is a measure of energy of a particular frequency.

It can then be shown that:

$$(2) \quad E_o(t) = \frac{R_m S_1(t) D_n}{R_L + R_m}$$

If $R_L$ is great compared to $R_m$, e.g. about 100 to 1, then $R_m + R_L$ approximately equals $R_L$. Thus $$(3) \quad E_o(t) \text{ approximately equals} \frac{R_m S_1(t) D_n}{R_L}$$

and if $$R_m = \frac{1}{\rho}$$

then $$(4) \quad E_o(t) = \frac{\frac{1}{\rho} X(t) D_n}{R_L}$$

which simplified is $$(5) \quad = \frac{D_n}{\rho R_L} X(t)$$

$$(6) \quad \sim \frac{D_n}{S_n} X(t)$$

$$E_o(t) \sim A_n X(t)$$

As shown in Equation 1, $$A_n = \frac{D_n}{S_n}$$

in which $D_n$ was the ideal measure of energy and $S_n$ was the actual measure of energy of the signal. Thus $A_n$ is the desired factor by which the input signal $X(t)$ is to be multiplied to obtain the desired output. $E_o(t)$ is the desired output which has been corrected or adjusted to have the desired measure of energy for the particular frequency.

Before the chemical integrator is used to analyze a second signal, the chemical integrator must be rest, that is substrate resistance 26A must have removed therefrom the metal or copper plated thereon from control element 24A for the particular type chemical integrator illustrated. This is accomplished by placing switches 18A and 20A in their 3 positions. This connects the negative terminal of voltage source 19A to control element 24A. As the flow of current is opposite to that while the signal was being integrated, plating will be removed from resistance 26A and redeposited on control element 24N.

While frequency $\omega_1$ was being analyzed and equalized as described above through chemical integrator 22A and constant current source 16A, the other frequency components $\omega_2$ to $\omega_n$ were similarly being operated upon to obtain a frequency output from chemical integrator 22B to 22n, each of which would have a quantity of energy as desired in accordance with the desired spectrum $S'(\omega)$. The output from each terminal 32A to 32n is connected to adder 40 where all the different frequency components which have been adjusted to have the proper energy content are added. The output of adder 40 then is an adjusted seismic signal having a frequency spectrum $S'(\omega)$. The recombined output then is conveyed through line 42 to a record or display means 44.

Each trace or seismic signal to be used in the preparation of a seismic section is equalized or adjusted in a manner similar to that described above. The adjusted seismic signals are arranged in a side-by-side relationship and displayed. The shot point parameter effects are eliminated which were present in the original recording or signal. The seismic section thus produced from the adjusted seismic signal is much easier to interpret and understand. Any changes in frequency or amplitude then are believed to be those occasioned or caused by the subsurface layering or beds themselves and not in near surface conditions.

It will be apparent to persons skilled in the art that many modifications of this invention are possible without departing from the spirit or scope thereof. Therefore, it is intended that the invention not be limited to the specific examples presented. It is therefore desired that only such limitations be imposed on the appended claims as are stated therein or required by the prior art.

What is claimed is:

1. An apparatus for processing a seismic signal which comprises in combination: a set of a plurality of parallel sharply-tuned band pass filter sections with each filter section being tuned for a different frequency; rectifier means connected to the output of each such filter section; a constant current source connected to the output of each said filter section and parallel with said rectifier means; a chemical integrator for each filter section, said chemical integrator having a control element and a substrate resistance; switching means when in one position to connect the substrate resistance to said constant current source and to disconnect the control element from the rectifier means and when in a second position to disconnect the substrate resistance from the constant current source and to connect the control element to the rectifier means.

2. An apparatus for processing a seismic signal which includes a channel which comprises: an electrical filter; a receifier means connected to the output of said filter; a constant current source connected to the output of said filter and in parallel with said rectifier means, said constant current source having a gain equal to $D_n$ in which $D_n$ is a measure of the desired energy content of the frequency component associated with said filter; a chemical integrator having a control element, a substrate resistance; a first switch having a common terminal and positions 1, 2 and 3; a second switch having a common terminal and positions 1, 2 and 3; means conecting the common terminal of said first switching means to said substrate resistance; means connecting the common terminal of said second switching means to said control element; means connecting the first position of said first switch to said constant current source; means connecting the second position of said second switch with the output of said rectifier means; a reset voltage source and means connecting the third position of said second switch with said reset voltage source.

3. An apparatus as defined in claim 2 in which said first and said second switching means are ganged such that when one is in its 1, 2 or 3 position, the other is likewise in its 1, 2 or 3 position.

4. An apparatus as defined in claim 2 in which said contsant current source includes an amplifier and a resistance $R_L$ connected in series in which the resistance $R_L$ is at least about 100 times the largest resistance $R_m$ of the substrate resistance.

5. An apparatus as defined in claim 2 in which there is a channel for each frequency component of interest within the seismic signal.

References Cited by the Examiner
UNITED STATES PATENTS

| | | | |
|---|---|---|---|
| 2,791,473 | 5/1957 | Mattox | 340—173 |
| 2,890,414 | 6/1959 | Snavely | 340—173 |
| 3,017,612 | 1/1962 | Singer | 340—173 |
| 3,121,856 | 2/1964 | Finney | 340—15.5 |
| 3,142,815 | 7/1964 | Picou | 340—15.5 |
| 3,167,710 | 1/1965 | Cox | 340—15.5 |
| 3,172,083 | 3/1965 | Constantine | 340—173 |

BENJAMIN A. BORCHELT, *Primary Examiner.*

R. M. SKOLNIK, *Assistant Examiner.*